US009747273B2

(12) United States Patent
Huang et al.

(10) Patent No.: US 9,747,273 B2
(45) Date of Patent: *Aug. 29, 2017

(54) STRING COMPARISON RESULTS FOR CHARACTER STRINGS USING FREQUENCY DATA

(71) Applicant: International Business Machines Corporation, Armonk, NY (US)

(72) Inventors: Shudong Huang, Vienna, VA (US); Jeffrey J. Jonas, Las Vegas, NV (US); Brian E. Macy, Henderson, NV (US); Frankie E. Patman Maguire, Washington, DC (US); Charles K. Williams, Oak Hill, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,162

(22) Filed: Aug. 19, 2014

(65) Prior Publication Data

US 2016/0055141 A1    Feb. 25, 2016

(51) Int. Cl.
*G06F 17/27* (2006.01)
*G06F 17/20* (2006.01)

(52) U.S. Cl.
CPC .......... *G06F 17/273* (2013.01); *G06F 17/278* (2013.01)

(58) Field of Classification Search
None
See application file for complete search history.

(56) References Cited

U.S. PATENT DOCUMENTS

| 5,404,514 | A | 4/1995 | Kageneck et al. |
| 5,488,725 | A | 1/1996 | Turtle et al. |
| 5,640,553 | A | 6/1997 | Schultz |
| 5,649,185 | A | 7/1997 | Antognini et al. |
| 5,737,734 | A | 4/1998 | Schultz |
| 5,742,816 | A | 4/1998 | Barr et al. |
| 5,745,745 | A | 4/1998 | Tada et al. |
| 5,765,150 | A | 6/1998 | Burrows |
| 5,794,237 | A | 8/1998 | Gore, Jr. |
| 5,826,261 | A | 10/1998 | Spencer |
| 6,041,323 | A | 3/2000 | Kubota |
| 6,144,958 | A | 11/2000 | Ortega et al. |
| 6,341,176 | B1* | 1/2002 | Shirasaki ........... G06K 9/72 382/229 |
| 7,251,665 | B1* | 7/2007 | Dunning ........... G06F 17/2765 |

(Continued)

FOREIGN PATENT DOCUMENTS

JP    2002297660    10/2002

OTHER PUBLICATIONS

List of IBM Patents or Patent Applications Treated as Related, Apr. 15, 2015.

*Primary Examiner* — Marcus T Riley
(74) *Attorney, Agent, or Firm* — Robert C. Bunker; Edell, Shapiro & Finnan, LLC

(57) ABSTRACT

A similarity between character strings is assessed by identifying first and second character strings as candidate similar character strings, determining a frequency of occurrence for at least one of the first and second character strings from a collection of character strings, and designating the first and second character strings as similar based on the determined frequency of occurrence.

9 Claims, 2 Drawing Sheets

(56) References Cited

U.S. PATENT DOCUMENTS

| | | | | |
|---|---|---|---|---|
| 8,065,307 B2* | 11/2011 | Haslam | ............ | G06F 17/30011 |
| | | | | 707/738 |
| 8,255,786 B1* | 8/2012 | Gattani | ............ | G06F 17/30014 |
| | | | | 715/205 |
| 8,315,849 B1* | 11/2012 | Gattani | ................... | G06F 17/28 |
| | | | | 704/10 |
| 8,923,626 B1* | 12/2014 | Stewenius | ......... | G06F 17/30247 |
| | | | | 382/218 |
| 9,076,445 B1* | 7/2015 | Lloyd | ................... | G10L 15/183 |
| 2006/0047656 A1* | 3/2006 | Dehlinger | ......... | G06F 17/30722 |
| 2007/0038615 A1* | 2/2007 | Vadon | ................... | G06F 17/273 |
| 2009/0171955 A1* | 7/2009 | Merz | ................ | G06F 17/30985 |
| 2012/0179642 A1* | 7/2012 | Sweeney | ............ | G06F 17/2785 |
| | | | | 706/55 |
| 2012/0271827 A1* | 10/2012 | Merz | ................... | G06F 17/3069 |
| | | | | 707/737 |
| 2014/0258301 A1* | 9/2014 | Misra | ............... | G06F 17/30731 |
| | | | | 707/739 |

* cited by examiner

STRING COMPARISON RESULTS FOR CHARACTER STRINGS USING FREQUENCY DATA

BACKGROUND

1. Technical Field

The present invention relates to comparison of data strings to find similarities between such data strings.

2. Discussion of the Related Art

String comparison algorithms are typically used for name comparisons in large volumes of data in order to enable names containing typographical or spelling errors to be equated. For example, consider a name "Patricia" and a typographical misspelling of the name, such as "Patircia". These two data strings representing a name will score very high using conventional edit distance algorithms, such as Jaro-Winkler distance or Damerau-Levenshtein distance algorithms, where a high score provides an indication that this pair of data strings represents variant forms of the same name. Edit-distance algorithms such as the types referenced herein can be very helpful for short name strings in which the number of characters in the strings may be insufficient for other string comparison methods to generate acceptable similarity scores.

However, short strings present another difficulty for string comparison algorithms. For example, when considering name strings of three or four characters, a single letter difference or even a transposition of two letters may be enough to distinguish completely different names. Consider, for example, the name strings "Mair" and "Amir". These two name strings contain a single transposition but they may be completely unrelated names. Similarly, the name strings "Bill" and "Jill" differ by one letter but are not related. String similarity calculations make no distinction in scoring between pairs like these (in which the name strings refer to different names) and a pair like "Patricia" and "Patircia" (which very likely represent the same name).

The inability to discriminate between certain string pairs is a significant weakness in name scoring algorithms, since it leads to increased numbers of false positives in search return sets. For example, using a scoring algorithm which allows a single character difference, a search on a name string "HAI LIN" could return any or all of the following: CAI LIN, BAI LIN, KAI LIN, LAI LIN, MAI LIN, NAI LIN, SAI LIN, TAI LIN, WAI LIN, XAI LIN, ZAI LIN, HAL LIN, HAK LIN, HAN LIN, HAO LIN, HAI LING, HAI WIN, HAI JIN, HAI QIN, HAI XIN, HAI LAN. Each of the returned name strings may be a legitimate name that is not related to the search name. However, conventional edit distance algorithms could very likely construe all of the return names as being the same.

SUMMARY

Accordingly, embodiments of the present invention include a method, a computer program product and a system for assessing a similarity between character strings by identifying first and second character strings as candidate similar character strings, determining a frequency of occurrence for at least one of the first and second character strings from a collection of character strings, and designating the first and second character strings as similar based on the determined frequency of occurrence.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product provide an improvement in string comparison results by utilizing frequency data associated with such string results to enhance accuracy of the string comparison results.

Figure 1:
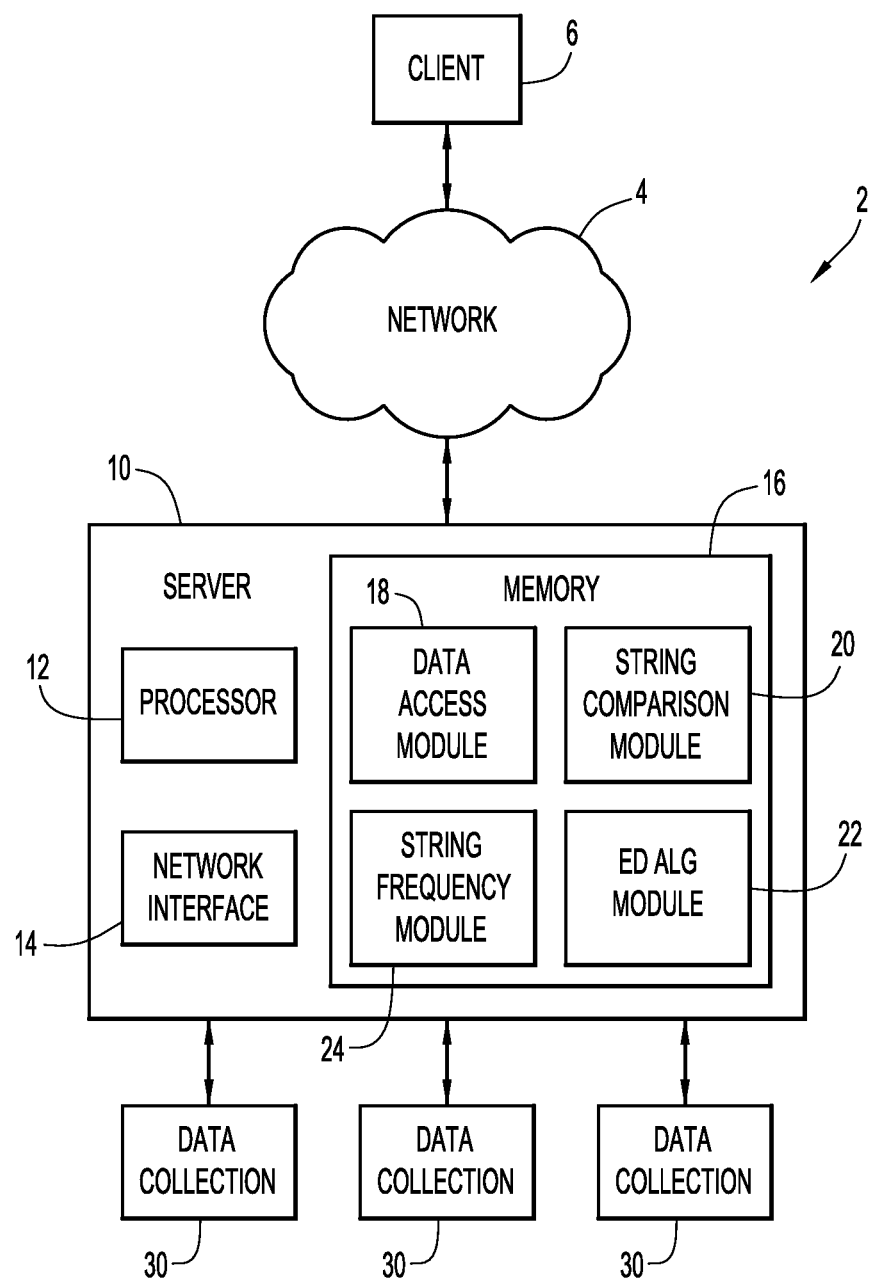
FIG. 1 is a diagrammatic illustration of an example computing environment for use with an embodiment of the present invention.

An example environment for use with present invention embodiments is illustrated in FIG. 1. Specifically, the environment includes one or more server systems, represented in FIG. 1 as server 10, and one or more client or end-user systems, represented in FIG. 1 as client 6. The server systems and client systems comprise computing systems that may be remote from each other and communicate over a network 4. The network may be implemented by any number of any suitable communications media (e.g., wide area network (WAN), local area network (LAN), Internet, Intranet, etc.). Alternatively, the server systems and client systems may be local to each other, and communicate via any appropriate local communication medium (e.g., local area network (LAN), hardwire, wireless link, Intranet, etc.). While FIG. 1 depicts a single server 10 and a single client 6 communicating over a network 4, it is to be understood that this environment is provided for example purposes only, and the system 2 can include any number of servers 10 configured to communication with any number of clients 6 via a single network 4 or any number of networks.

The client/server system 2 depicted in FIG. 1 facilitates communications and exchange of data between each client 6 and each server 10, including searching for data as well as insertion, deletion or editing of data by a client or a server in relation to one or more databases such as the data collection units 30 depicted in FIG. 1. Each data collection unit 30 includes data that can be stored in any one or more suitable configurations and formats.

For example, data can be stored as records in which character strings are stored within fields of the data records. Data records can include information about people, where character strings may represent names of people, residential and/or business addresses of people and/or any other types of information associated with people. The data can also be stored as massive name data collections (MNDCs), where the data comprises name character strings representing a vast number of names (e.g., millions of names in the MNDCs), where the name character strings may be associated with different instances of data (where each instance of data comprises at least a name character string and potentially other data associated with the name character string). The data can also be stored in any other suitable format. The data can also comprise any types of information associated with businesses, associations, social networks, or any other grouping of information that may be desirable to store in a manner that allows for retrieval (for example, by client and/or server queries) of one or more subsets of the data. It is further noted that, while FIG. 1 depicts a communication link between a server 10 and data collection units 30 that is outside or not part of the network 4, in an alternative arrangement one or more servers can communicate with one or more data collection units via the network. Further still, any one or more of the data collection units 30 can be implemented as part of a server system.

Each server 10 includes a processor 12, a network interface 14, and memory 16. The network interface 14 of the server 10 can comprise, for example, one or more of an Ethernet interface card or switch, a modem, a router or any other suitable hardware device (either integrated as part of the server hardware or a separate unit configured for external connection and communication with the server) that facilitates a wireless and/or hardwire connection over the network 4 with one or more client devices 6, one or more other servers 10 and/or any other types of computing devices.

The processor 12 of each server 10 can comprise one or more microprocessors that execute control process logic instructions, including operational instructions and software applications stored within software modules of memory 16. The memory 16 of each server 10 comprises one or more computer readable storage media that can be implemented by any conventional or other one or more memory or storage devices, and may include any suitable storage capacity. For example, the memory 16 may comprise read only memory (ROM), random access memory (RAM), erasable programmable read-only memory (EPROM), magnetic disk storage media devices, optical storage media devices, flash memory devices, electrical, optical, or other physical/tangible memory storage devices (i.e., each computer readable storage medium of the memory 16 includes physical structure and is not simply a carrier wave or signal). Each computer readable storage medium of the server memory 16 is encoded with software comprising computer executable instructions as described herein such that, when the software is executed (by processor 12), it is operable to perform the processing steps for accessing data including character strings of information from data collection units 30 and further providing string similarity scores for character strings based upon the techniques described herein.

Each client 6 similarly includes a processor, memory including software applications for execution by the processor to facilitate operations of the client (including communications with one or more servers to facilitate exchange of data), and a network interface to facilitate a wireless and/or hardwire connection over the network 4 with one or more servers 10, one or more other clients 6 and/or any other types of computing devices.

Each of the servers 10 and clients 6 may further be implemented by any conventional or other computer systems equipped with any suitable peripheral and/or other devices including, without limitation, a display or monitor and/or other output devices (e.g., one or more speakers), optional input devices (e.g., a keyboard, mouse or other input device), and any commercially available and custom software (e.g., server/communications software, module, browser/interface software, etc.).

For example, each server 10 can include a data access module 18 including one or more software applications to facilitate searching and obtaining access to data as well as insertion, deletion and edit operations associated with data stored within the data collection units 30 as well as any other databases associated with the system 2. Each server 10 can further include a string comparison module 20 including one or more software applications to perform string comparisons on accessed date from such databases, an edit distance algorithm module including one or more software applications that provide edit distance algorithms for use by the string comparison module 20 based upon techniques described herein, and a string frequency module 24 including one or more software applications to perform string frequency assessments of character strings within accessed databases utilizing techniques as described herein. The modules may be implemented by any combination of any quantity of software and/or hardware modules or units. While the system 2 of FIG. 1 depicts such modules residing within memory 16 of one or more servers 10, it is noted that the modules can instead be located at any other suitable computing devices, including one or more clients 6. In addition, modules 18, 20, 22 and 24 can be separate (as depicted in FIG. 1) or, alternatively, any two or more of these modules can be combined or integrated as a single module.

An example method for performing character string comparison results based upon frequency data obtained for character strings and utilizing system 2 of FIG. 1 is now described with reference to the flow chart of FIG. 2. In an example embodiment, character string comparisons are performed for character strings that comprise information representing the names of persons, where each character string comprises a specific sequence of alphanumeric and/or other characters (e.g., a character string of the characters "Patricia"). For example, as previously noted, data collection units 30 can include records or other forms of data for people (e.g., employees of one or more companies, members of one or more organizations, users of one or more social networks, etc.), where the data records can be searchable by the names of the persons associated with such records. Depending upon the volume of people within the databases, it is important to be able to automatically distinguish a pair of names as either being highly similar and thus associated with the same person or, alternatively, not being sufficiently similar to be associated with the same person.

Figure 2:
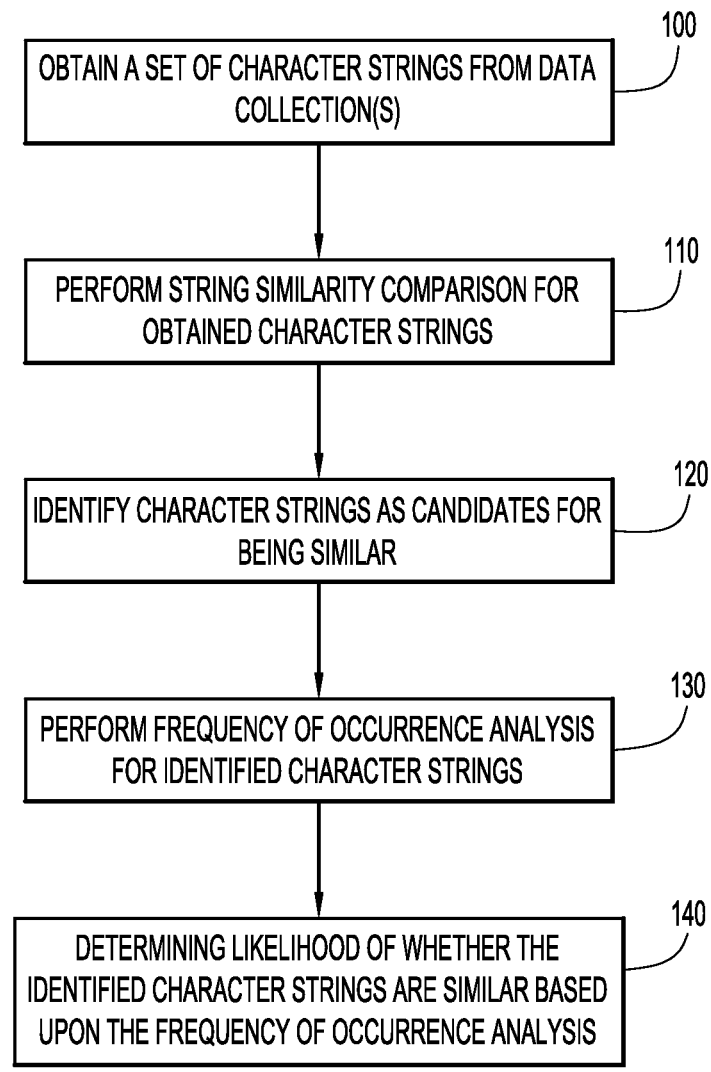
FIG. 2 provides a flowchart depicting an example method of comparing character strings of data from one or more databases and determining similarity based upon character frequencies within the one or more databases in accordance with an embodiment of the present invention.

Referring to FIG. 2, similarity comparison occurs when a plurality of character strings are initially obtained from one or more data collection units 30. A plurality of characters strings can be obtained for purposes of similarity comparison for any number of reasons. For example, a plurality of character strings can be obtained as part of a set of search result records retrieved based upon a query submitted by a client 6 to a server 10 for data relating to a person, where the server (utilizing the data access module 18) obtains search results of data from unit(s) 30 based upon the client query (e.g., a client query for records associated with the name "Patricia"). In another example embodiment, a plurality of character strings from one or more of the data collection units 30 can be obtained based upon a server 10 searching for and identifying erroneous data (e.g., misspelling of names) within one or more of the data collection units 30 (e.g., for purposes of correcting and/or removing such erroneous data from the data collection units).

The obtained character strings can be obtained based upon a search for the character strings and/or based upon search results utilizing different search criteria. For example, a search may be conducted for all employees within a certain branch or division of a company, such that a series of records are returned in a search result set that includes a collection of obtained name character strings from the search result set. The obtained name character strings may then be analyzed according to the process set forth in FIG. 2.

At 110, the server 10, utilizing processor 12 and string comparison module 20, performs a string similarity comparison for obtained character strings. In an example embodiment, the string similarity comparison comprises a comparison between a pair of character strings to determine a degree of similarity of characters within the character strings. For example, one or more edit distance algorithms can be selected from the edit distance algorithm module 22 for comparing a pair of character strings to determine an initial similarity score associated with the pair of character strings. As previously noted, two example edit distance algorithms are a Jaro-Winkler distance algorithm and a Damerau-Levenshtein distance algorithm. However, any other types of edit distance algorithms and/or any other types of string comparison algorithms may also be utilized.

The edit distance algorithms apply a calculation to two character strings based upon the exact type of characters as well as their precise sequence within the character strings. Thus, for example, when comparing the character string for the name "Patricia" with the character string for "Patircia", a degree of similarity as determined by an edit distance algorithm between these two character strings would be greater than a comparison between the character string "Patricia" and the character string "Patrick". This is because "Patircia" has a greater number of the same characters that are also in the same sequence or in close proximity of sequence within the character string as compared to the character string "Patricia" as opposed to the comparison of "Patrick" with "Patricia".

Utilizing the string comparison module 20 and the one or more edit distance algorithms, an initial similarity score can be automatically obtained by the server 10 for any pair of character strings in the obtained set of character strings so as to identify character strings as potential candidates for being similar at 120. While the string comparisons described herein are in relation to a pair or two character strings, it is noted that string comparisons may also be performed for three or more character strings.

The edit distance algorithms can calculate the initial similarity score based upon criteria such as that previously noted (e.g., same types and/or number of characters, sequential location of characters, etc.). The initial similarity score can be provided, for example, as a percentage value. Referring to the previous example, a similarity score between the pair of character strings "Patricia" and "Patircia" might be set to 95% (where an exact match is represented by 100%), while a similarity score between the pair of character strings "Patricia" and "Patrick" might be set to some value less than 95% (e.g., 80% or less). The identification of character strings as being potentially similar can be based upon some threshold value for the initial string similarity score that was calculated utilizing one or more edit distance and/or other string similarity scoring algorithms. For example, for a particular embodiment, an initial string similarity score of 90% may be selected as a threshold for identifying a pair of name character strings as potential candidates for being similar.

The previous example for automatically finding similarities in character strings utilizing string similarity comparisons (e.g., edit distance algorithms) and based upon a character string representing a name such as "Patricia" can be effective when searching through a significantly large set of data from one or more data collections, particularly for character strings having a moderate to large number of characters. However, as the character size of a character string becomes shorter, such string similarity comparison techniques can become problematic due to the occurrence of false positives between pairs of character strings. For example, consider character string pairs such as "Bill" and "Jill", or "Jim" and "Kim". Automated string similarity comparisons, which are necessary when searching large collections of data, do not take into account the fact that certain names (or other types of data) may be very similar in types and alignment or sequence of characters within the string yet may also be associated with different persons. For example, a similarity score between "Bill" and "Jill" may be calculated as very high (e.g., 90% or greater) when in fact these character strings represent two different persons.

The false positive issue for string similarity comparisons can further be elevated when considering groups of people in certain cultures having names that are similar. For example, when utilizing a character string similarity comparison, even a comparison that may only allow a single character difference to find potential matches between character strings, for a name character string such as "HAI LIN" may return a number of false positives due to the small character string size and potential similarity in names. In this example, the following potential character strings from the data set being compared with "HAI LIN" might be considered very similar (e.g., a similarity score of 90% or greater): CAI LIN, BAI LIN, KAI LIN, LAI LIN, MAI LIN, NAI LIN, SAI LIN, TAI LIN, WAI LIN, XAI LIN, ZAI LIN, HAL LIN, HAK LIN, HAN LIN, HAO LIN, HAI LING, HAI WIN, HAI JIN, HAI QIN, HAI XIN, HAI LAN. Each of these name strings may be a legitimate name that is not related to the "HAI LIN", indicating that the string similarity comparison provided a number of false positive (and thus inaccurate and non-useful) results.

In accordance with the present invention, the accuracy of string similarity scores between two or more character strings, such as name character strings, is improved based upon a frequency analysis of the character strings within the one or more databases from which the character strings are stored. With reference again to FIG. 2, after a string similarity comparison between character strings of the obtained set (step 110) and an identification of character strings as potential candidates for being similar (step 120) have occurred, a frequency analysis is performed by the server 10 (utilizing processor 12 and the string frequency module 24). The frequency analysis obtains information regarding a frequency of occurrence for a particular character string (e.g., how many times the exact character string is stored for different records or other instances of data) within one or more of the data collection units 30. For example, the frequency analysis can be applied to the entire collection of data within data collection units 30 or, alternatively, to one or more subsections of the entire data collection (as further described herein).

Referring again to the example embodiment of the name character strings "Patricia", "Bill" and "Jill", such names are very common and may likely appear multiple times particularly in an extremely large database such as a massive name data collection (MNDC) (e.g., a MNDC stored within a plurality of data collection units 30). As an example, the name "Patricia" may be associated with several hundred thousand instances of data associated with people within a MNDC that includes data information for millions of person names (e.g., names associated with a personnel directory for a large company, association or other enterprise). In contrast, a misspelling of Patricia, such as the name character string "Patircia", may only be associated with a small number (e.g., less than 10) of instances of data within the MNDC.

Referring again to FIG. 2, at 140, information about the frequency of occurrence of a character string for instances of data within a MNDC or other types of databases is utilized to determine a likelihood of whether identified character strings are in fact similar. For example, information about the frequency of occurrence of the character string can be utilized to correct or adjust the initial string similarity score to obtain a final string similarity score that is more accurate in relation to the comparison between two or more character strings. In particular, a correction or adjustment factor can be applied to the initial string similarity score obtained based upon string similarity comparison between two or more character strings, where the adjustment factor is inversely proportional to the frequency of occurrence of a character string within the pair. In other words, a low frequency of occurrence of a character string within a selected set of data (e.g., the entire data collection or a subset of the data collection) can have the effect of increasing the value of the initial string similarity score to obtain the final string similarity score. In contrast, a high frequency of occurrence of a character string within the selected set of data can have the effect of decreasing the value of the initial string similarity score to obtain the final string similarity score.

Adjustment of the initial string similarity score to the final string similarity score can be performed in a number of different ways. For example, the server 10 can be configured, via operation of one or more of modules 18-24, to adjust the initial string similarity score to a greater value as the final string similarity score only when the frequency of occurrence of a character string within the selected set of data is no greater than a low frequency threshold value (where this value can depend upon the size of the selected data set). Similarly, the server 10 can also be configured to adjust the initial string similarity score to a lower value as the final string similarity score only when the frequency of occurrence of a character string within the selected set of data is greater than a high frequency threshold value. Alternatively, the final string similarity score can be determined based upon some calculation, such as (initial string similarity score)×(Adjustable scaling factor)÷(frequency of occurrence value for character string within selected set of data). The final string similarity score can also be adjusted in a variety of other ways utilizing the frequency of occurrence determination for a character string.

The frequency of occurrence information that is obtained for character strings of a pair can also be normalized in some manner prior to applying some correction or adjustment factor to the initial string similarity score for a pair of character strings. In particular, different sets of character strings might from one or more data collections might need to be treated differently based upon the categorization of the character strings.

Consider, for example, a data set of name character strings for names of military personnel in which fewer women names might appear in relation to men names. In this scenario, each name character string is associated with a record or other instance of data that includes attributes such as gender information. In a scenario in which a pair of name character strings such as "BRENDAN" and "BRENDA" are compared, an initial string similarity score may be high (for example, 90% or greater) due to the similarities between the two names. In addition, the frequency of occurrence of the name character string "BRENDA" within the military personnel data set being reviewed could also be small (since the number of male names might be significantly greater than the number of female names within the data set). In this example, the frequency of occurrence analysis may provide a false positive indication that "BRENDA" is similar (possibly a typographical error) in relation to "BRENDON".

However, by normalizing the frequency of occurrence information based upon gender, the possibility of such a false positive indication can be avoided. For example, in the military personnel scenario, or any other scenario in which gender may impact the frequency of occurrence of a name character string within a data set, normalizing of the frequency of occurrence information can be applied so as to correct for a smaller number of traditionally male or female names within a data set. In the example comparing "BRENDA" with "BRENDAN" for the military personnel data set, the frequency of occurrence score for a name character string associated with a female gender may be increased by a selected factor (for example, multiply frequency of occurrence by a selected value X) to normalize the frequency of occurrence information for the female name character string in relation to a male character string within the data set.

Another example for normalizing frequency of occurrence information from a data set can be in scenarios in which name character strings associated with one country are more significantly represented within a data set in relation to name character strings associated with another country (where the name character strings are associated with records or other instances of data that include other attributes such as country location, gender, etc.). Other ways of normalizing frequency of occurrence information based upon one group of character strings that may be more representative of the data set in relation to another group of character strings are also possible.

Some examples are now provided showing implementation of the techniques described in relation to the flowchart of FIG. 2 utilizing a system such as that set forth in FIG. 1.

Example 1

A search is conducted by server 10 for instances of data (e.g., employee data records) stored within data collection units 30 in relation to the following name character strings: "FRED", "PATRICIA" and "AMIR". The data collection units 30 comprise a MNDC containing 800+ million names.

After application of steps 100-120, a number of name character strings from the data collection units 30 that are identified as being potential candidates for being similar with the name character strings of the search, where potential candidates are selected based upon a minimum or threshold value for the initial string similarity score between pairs of name character strings (e.g., a minimum or threshold score of 90%). The following pairs are provided as examples:

PATRICIA and PATIRCIA;
FRED and RFED; and
AMIR and MAIR.

An initial string similarity score of 91% is determined for the similarity of the character strings for each of these pairs. This is due to the string similarity comparison analysis being performed on each pair (e.g., utilizing one or more edit distance algorithms, such as the Jaro-Winkler Damerau-Levenshtein types) and due to the fact that, for each pair, the same types and number of alphanumeric characters are provided in each character string as well as the transposition of two adjacent characters being the only difference between the character strings for each pair. Accordingly, the initial string similarity score is not 100% (i.e., not a perfect match), but the 91% score provides an indication that the character strings for each pair are, at least initially, considered good or strong candidates for representing the same name of a person.

Performance by the server 10 of a frequency of occurrence analysis of the name character strings from each pair (step 130), the following frequency of occurrence data was determined:

| Name Character String | Frequency of Occurrence |
|---|---|
| PATRICIA | 80,000 |
| PATIRCIA | 5 |
| FRED | 36,250 |
| RFED | 1 |
| AMIR | 35,723 |
| MAIR | 12,576 |

Based upon the frequency of occurrence data, the server 10 either increases or maintains the initial string similarity score for the PATRICIA/PATIRCIA and FRED/RFED pairs (i.e., final string similarity score either stays the same at 91% or is increased), while the initial string similarity score for the AMIR/MAIR pair is decreased to some value less than 91%. As is evident from the frequency of occurrence data, AMIR and MAIR are very common names within the data collection being considered and thus do not likely represent the same name for a person. In contrast, the frequency of occurrence of PATIRCIA and RFED indicate a very low occurrence of these name character strings (e.g., these may be typographical mistakes for the name pairs to which they are associated), such that the initial string similarity score is validated or even increased to indicate that the name character strings are likely associated with the same person name.

Example 2

A search is conducted by server 10 for instances of data (e.g., employee data records) stored within data collection units 30 in relation to the following name character string: "HAI LIN", where the data collection units 30 comprise a MNDC containing 800+ million names.

After application of steps 100-120, a number of name character strings from the data collection units 30 that are identified as being potential candidates for being similar with HAI LIN. The following pairs are provided as examples:

HAI LIN and CAI LIN; and
HAI LIN and CAI LNI.

An initial string similarity score of 90% is determined for the similarity of the character strings for each of these pairs (based upon string similarity comparison analysis similar to that described in Example 1). The initial string similarity score is not 100% (i.e., not a perfect match), but the 90% score provides an indication that the character strings for each pair are, at least initially, considered good or strong candidates for representing the same name of a person.

Performance by the server 10 of a frequency of occurrence analysis of the name character strings from each pair (step 130), the following frequency of occurrence data was determined:

| Name Character String | Frequency of Occurrence |
|---|---|
| HAI LIN | 14,000 |
| CAI LIN | 14,000 |
| CAI LNI | 3 |

Based upon the frequency of occurrence data, the server 10 either increases or maintains the initial string similarity score for the HAI LIN/CAI LNI pair (i.e., final string similarity score either stays the same at 90% or is increased), while the initial string similarity score for the HAI LIN/CAI LIN pair is decreased to some value less than 90%. This is due to the fact that there is a high frequency of the name CAI LIN within the data collection, indicating that HAI LIN and CAI LIN are very likely not similar (i.e., not the same name of a person). The low frequency of occurrence of CAI LNI results in an indication that there is a good potential for similarity.

In this example, it can be seen that the name character string CAI LNI is likely a typographical misspelling of CAI LIN and therefore may not in fact be similar to HAI LIN. However, the indication that the data instances associated with the name character strings HAI LIN and CAI LNI would provide identification or notice to a user that there is a mistake in the name character string for CAI LNI when the user reviews the results for name character strings determined as being similar to HAI LIN (which in turn would facilitate a correction to the instance of data associated with CAI LNI to correct the name character string).

Thus, the present invention facilitates an enhancement to character string comparison analysis by utilizing frequency of occurrence data for character strings within a data collection to improve the accuracy of the character string comparison analysis.

As previously noted, frequency of occurrence information can be normalized based upon one or more identified groups of character strings that provide a greater representation within a data set being examined in relation to one or more other identified groups of character strings. In other embodiments, it may be desirable to partition a data collection and then perform character string comparison analysis combined with frequency of occurrence analysis in a specific partition of the data collection based upon one or more attributes associated with character strings of interest for the analysis. For example, a massive database (e.g., located in one data collection unit or scattered among a plurality of data collection units) such as an MNDC can be partitioned based upon a number of different criteria, such as gender partitions, cultural or regional partitions (where instances of data are partitioned based upon geographical and/or cultural regions of persons associated with such instances of data), partitions based upon divisions or designated groups within a company, association or other enterprise, etc., where the partitioned database is then examined for similarity of name character strings utilizing techniques as described herein. The partitioning of data can be achieved in any suitable manner, such as storage of certain types of data within specific data locations of the database, or based upon one or more attributes associated with instances of data. For example, instances of data can comprise employee records, where each employee record includes a field including a name character string for the employee as well as other fields containing attributes of the employee such as division in which the employee is employed, region/location of the employee, cultural designation of employee (e.g., Caucasian, Hispanic, etc.), etc. Such attributes can be used to partition the data for character string similarity analysis based upon the attributes.

Focusing on a particular or specific partition within a massive data collection can be advantageous depending upon particular commonalities in names associated with such partitions. For example, the character string "SMITH" is a common surname in the US or some European countries (e.g., the UK), while the character string "LIN" is a common surname in China or other Asian countries.

As previously noted, a name character string such as "HAI LIN" may be considered similar and thus provide the same or similar initial string similarity score based upon a string similarity comparison with a number of other names, such as CAI LIN, BAI LIN, KAI LIN, LAI LIN, MAI LIN, NAI LIN, SAI LIN, TAI LIN, WAI LIN, XAI LIN, ZAI LIN, HAL LIN, HAK LIN, HAN LIN, HAO LIN, HAI LING, HAI WIN, HAI JIN, HAI QIN, HAI XIN, HAI LAN, etc. By partitioning a string similarity analysis to a specific partition of a massive MNDC or other type of database to a set of data based upon a cultural or regional attribute, frequency of occurrence data may be more relevant and meaningful for establishing a greater degree of certainty regarding whether the name character strings of a pair are the same or similar. For example, by partitioning the analysis to a specific partition based upon a cultural or regional attribute for the data being analyzed in Example 2, the obtained character strings to be analyzed for similarity can be reduced from instances of data of the entire database (e.g., an MNDC containing 800+ million names) to a smaller size that more accurately reflects the search (e.g., reducing the obtained character strings for analysis to a specific partition of the MNDC that contains less than one million names).

It will be appreciated that the embodiments described above and illustrated in the drawings represent only a few of the many ways of implementing embodiments for improving string comparison results for data pairs using frequency data.

The environment of the present invention embodiments may include any number of computer or other processing systems (e.g., client or end-user systems, server systems, etc.) and databases (e.g., one or more MNDCs or other data collection units) or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., software within modules of the server systems and/or client systems) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g.,) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g.,). The database system may be implemented by any number of any conventional or other databases, data stores or storage structures (e.g., files, databases, data structures, data or other repositories, etc.) to store information (e.g.,). The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., obtaining search query information, providing string similarity scores and/or other result information based upon the string similarity analysis techniques described herein), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

String similarity analysis information may be provided in reports and/or in any other suitable manner and may include any information arranged in any fashion, and may be configurable based on rules or other criteria to provide desired information to a user.

The present invention embodiments are not limited to the specific tasks or algorithms described above, but may be utilized for any type of string character analysis (e.g., name character string analysis or any other type of string character analysis) between two or more character strings for any selected number of string comparisons.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A system for assessing similarity between character strings, the system comprising:
    a data collection to store a collection of character strings; and
    a server to access the data collection, the server comprising a processor configured with logic to:
        calculate an initial similarity score for a first character string and a second character string based on an edit distance algorithm;
        identify the first character string and the second character string as candidate similar character strings from the data collection based on the calculated initial similarity score being greater than or equal to a similarity threshold value;
        determine, when the first character string and the second character string are identified as similar character strings, a frequency of occurrence for at least one of the first character string and the second character string from the collection of character strings, wherein the frequency of occurrence comprises a total number of times that at least one of the first character string and the second character string is present in the collection of character strings; and
        decrease an occurrence of false designations of character strings as being similar, the decreasing further comprising:
            adjusting the initial similarity score to a greater value as a final similarity score when the determined frequency of occurrence is no greater than a low frequency threshold value,
            adjusting the initial similarity score to a lower value as the final similarity score when the frequency of occurrence is greater than a high frequency threshold value, and
            designating the first character string and the second character string as similar based on the final similarity score being greater than or equal to the similarity threshold value.

2. The system of claim 1, wherein the first character string and the second character string stored within the data collection include a name.

3. The system of claim 1, wherein the collection of character strings is partitioned based on one or more attributes of the character strings, and the processor is configured to determine the frequency of occurrence by:
    identifying a specific partition of the collection of character strings based on an attribute of the first character string and the second character string; and
    determining the frequency of occurrence of at least one of the first character string and the second character string from the specific partition of the collection of character strings.

4. The system of claim 1, wherein the processor is further configured to:
    normalize the determined frequency of occurrence of at least one of the first character string and the second character string.

5. The system of claim 4, wherein the processor is configured to normalize the determined frequency of occurrence of each of the first character string and the second character string by:
    identifying a first group of character strings and a second group of character strings within the collection of character strings, wherein the first group includes a greater number of character strings in relation to the second group; and
    modifying the determined frequency of occurrence of the second character string to a greater value.

6. A computer program product for assessing similarity between character strings, the computer program product comprising:
    a computer readable storage medium having computer readable program code embodied therewith, the computer readable program code configured to:
        calculate an initial similarity score for a first character string and a second character string based on an edit distance algorithm;
        identify the first character string and the second character string as candidate similar character strings from a collection of character strings based on the calculated initial similarity score being greater than or equal to a similarity threshold value;
        determine, when the first character string and the second character string are identified as similar character strings, a frequency of occurrence for at least one of the first character string and the second character string from the collection of character strings, wherein the frequency of occurrence comprises a total number of times that at least one of the first character string and the second character string is present in the collection of character strings;
        decrease an occurrence of false designations of character strings as being similar, the decreasing further comprising:

adjusting the initial similarity score to a greater value as a final similarity score only when the determined frequency of occurrence is no greater than a low frequency threshold, adjusting the initial similarity score to a lower value as the final similarity score when the frequency of occurrence is greater than a high frequency threshold value, and designating the first character string and the second character string as similar based on the final similarity score being greater than or equal to the similarity threshold value.

7. The computer program product of claim 6, wherein the collection of character strings is partitioned based on one or more attributes of the character strings, and the computer readable program code is further configured to determine the frequency of occurrence by:

identifying a specific partition of the collection of character strings based on an attribute of the first character string and the second character string; and determining the frequency of occurrence of at least one of the first character string and the second character string from the specific partition of the collection of character strings.

8. The system of claim 1, wherein the collection of character strings stores a collection of people names such that the first and second character strings represent names of people.

9. The computer program product of claim 6, wherein the collection of character strings stores a collection of people names such that the first and second character strings represent names of people.

* * * * *